July 3, 1928.
H. S. GOODKOWITZ
1,675,488
VEHICLE WHEEL RIM
Filed April 7, 1926     2 Sheets-Sheet 1
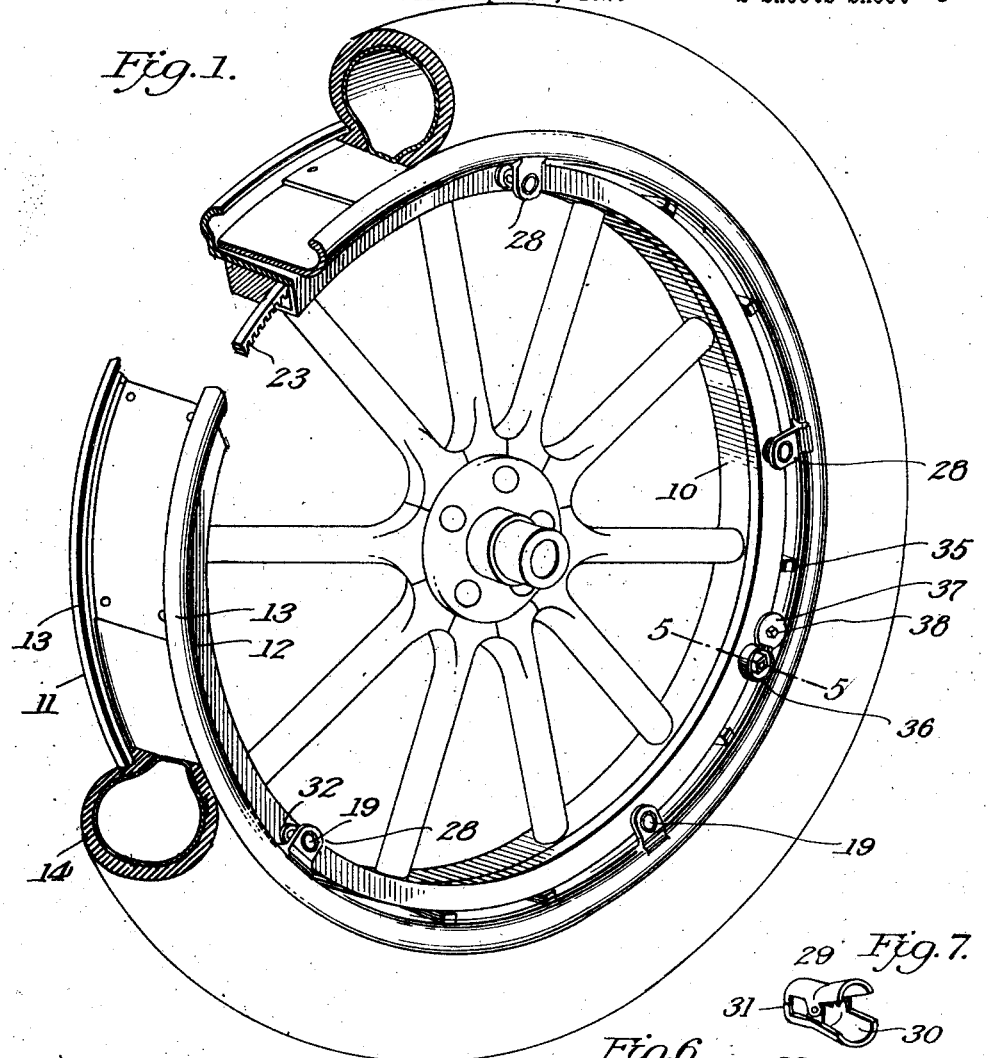
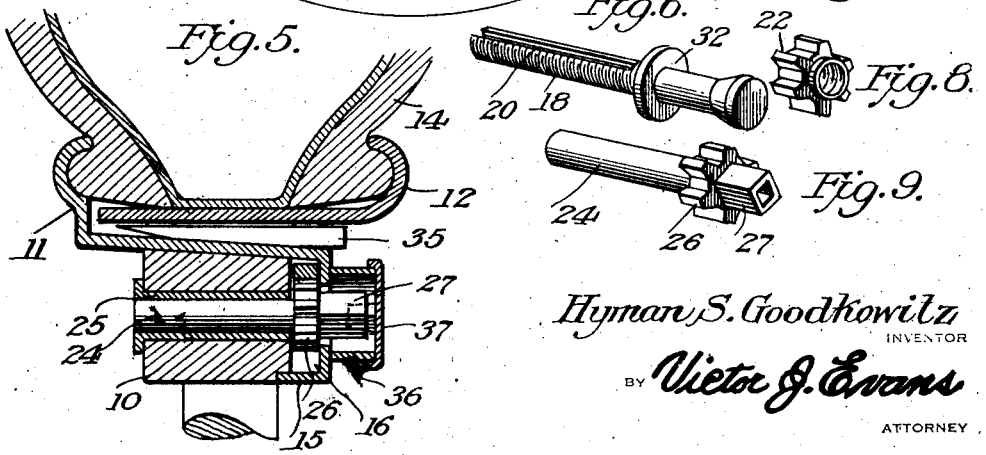
Hyman S. Goodkowitz
INVENTOR
BY Victor J. Evans
ATTORNEY July 3, 1928.
H. S. GOODKOWITZ
VEHICLE WHEEL RIM
Filed April 7, 1926
1,675,488
2 Sheets-Sheet 2
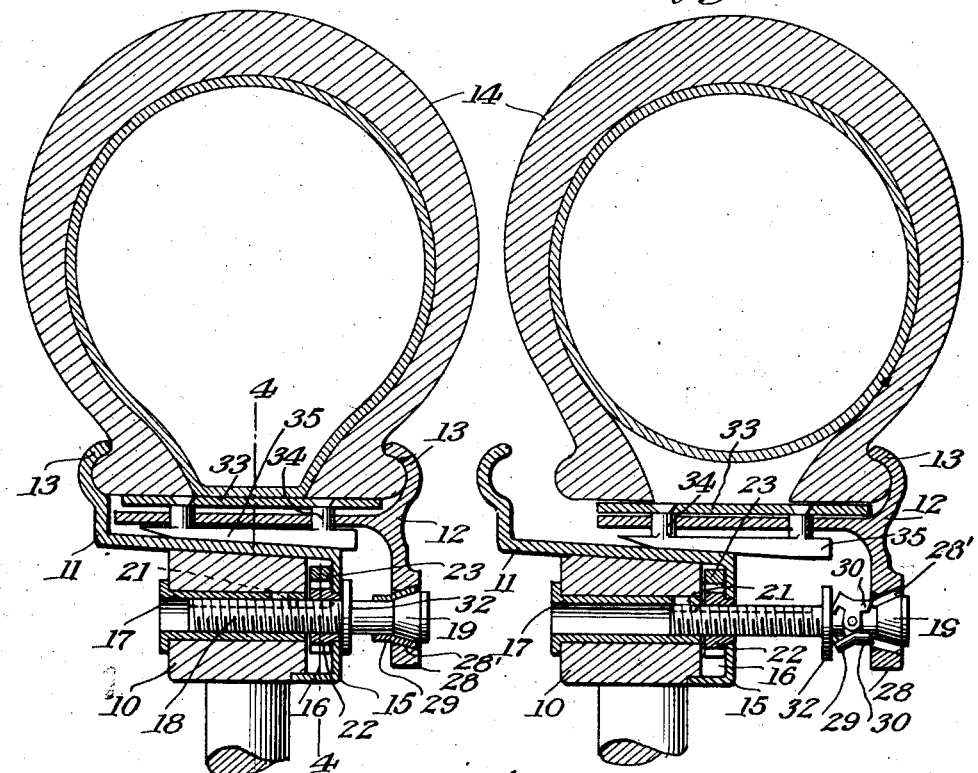
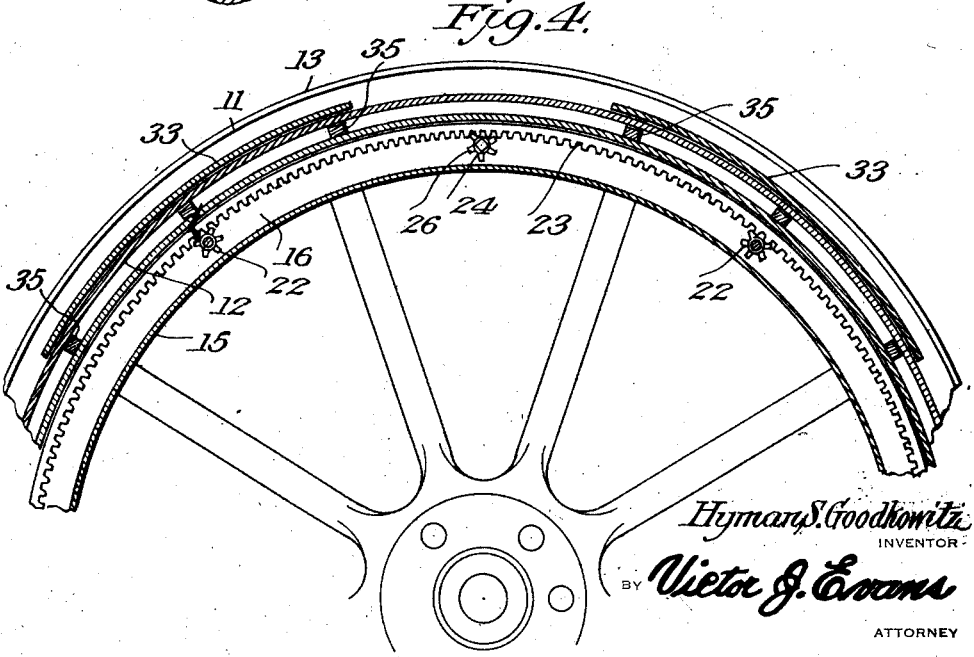
Hyman S. Goodkowitz
INVENTOR
BY Victor J. Evans
ATTORNEY Patented July 3, 1928.

1,675,488

UNITED STATES PATENT OFFICE.

HYMAN S. GOODKOWITZ, OF SUFFOLK, VIRGINIA.

VEHICLE WHEEL RIM.

Application filed April 7, 1926. Serial No. 100,436.

This invention relates to improvements in vehicle wheel rims and has for an object the provision of a rim from which a tire may be easily and quickly removed and remounted.
To this end, the invention includes a sectional rim having means for separating and clamping the sections to facilitate removing and remounting a tire, the separating and clamping means also acting to release and grip the tire, the operation being controlled by a single operating element, so that the entire operation of demounting and remounting a tire may be performed in a very short time and with a minimum amount of effort.

Another object of the invention is the provision of a rim which, in addition to the above and other advantages, is simple and durable in construction and reliable and efficient in use.

With the above and other objects in view, the invention further includes the following novel features and details of construction, to be hereinafter more fully described, illustrated in the accompanying drawings and pointed out in the appended claims.

In the drawings:—

Figure 1 is a perspective view illustrating the invention, parts being broken away to more clearly show the structure.

Figure 2 is a transverse sectional view showing a tire clamped in position.

Figure 3 is a similar view with the rim arranged in position for removing or remounting a tire.

Figure 4 is a section taken substantially on the line 4—4 of Figure 2.

Figure 5 is an enlarged fragmentary section taken substantially on the line 5—5 of Figure 1.

Figure 6 is a detail perspective view of one of the locking bolts.

Figure 7 is a similar view of one of the bushings.

Figure 8 is a like view of one of the pinions.

Figure 9 is a detail perspective view of the operating member.

Referring to the drawings in detail wherein like characters of reference denote corresponding parts, the reference character 10 indicates the felly of a wheel and while the wheel is illustrated as of the artillery type, the invention is capable of use with disk wheels, or with wheels of any other character.

The rim which constitutes the present invention comprises a pair of circumferential rim sections and includes an inner section 11 and an outer section 12. Each of these sections is provided with the usual flange 13 to engage the beads of a tire 14. The sections 11 and 12 overlap, that is, the outer section overlaps the inner section, and the former is provided with an annular flange 15 which is substantially L-shaped in cross section and is secured to the felly 10 in a manner to provide an annular chamber 16 which extends entirely around the felly.

Extending through the felly 10 are sleeves 17 which are spaced radially around the felly and may be of any desired number. These sleeves receive threaded bolts 18 which extend outwardly through the chamber 16 and are provided with beveled heads 19. The bolts 18 are longitudinally grooved as indicated at 20 and extending from the sleeves 17 into these grooves are lugs 21, so that the bolts will be prevented from rotating within the sleeves, but may be permitted free sliding movement.

Mounted upon each of the bolts 18 within the chamber 16 is an internally threaded pinion 22 which engages the threads of the bolts 18, so that when the pinions 22 are rotated, the bolts will be moved inwardly or outwardly, depending upon the direction of rotation of the pinions.

The pinions 22 of the bolts 18 are adapted to be simultaneously rotated and for this purpose there is provided within the chamber 16 an annular rack 23 whose teeth engage the pinions.

In addition to the bolts 18 there is provided an operating member 24 which operates within a sleeve 25, similar to the sleeves 17. This member has fast thereon a pinion 26 which also engages the toothed rack 23. The operating member 24 is provided with a rectangular socketed extension 27 to be engaged by a suitable wrench or operating tool so as to rotate the operating member. The pinion 26 will thus drive the rack 23 and the latter will simultaneously rotate all of the pinions 22 so as to operate the bolts 18.

The outer section of the rim is provided with a plurality of inwardly extending radially disposed rigid lugs 28 which are provided with openings 28'. The walls of these openings are beveled in conformity with the beveled heads 19 of the bolts 18. Mounted upon the bolts 18 are bushings 29. These bushings include separate pivotally connected sections 30 which are adapted to engage the heads 19 and the adjacent portions of the bolts 18. The sections 30 of the bushings are provided at their inner ends with stop lugs 31. The bolts 18 are provided with collars 32 which are adapted to be engaged by the inner ends of the bushings as shown in Figure 3 of the drawings.

Arranged within the rim are segmental clamping plates 33 which carry lugs 34, the latter extending through openings provided in the outer section of the rim and having connected thereto wedges or runners 35. These wedges or runners are positioned between the overlapped portions of the inner and outer sections and are disposed transversely of said sections.

When it is desired to remove a tire from the rim, the member 24 is rotated so as to operate the bolts 18 and feed the latter outwardly. The collars 32 of the bolts will engage the inner ends of the bushings 29 and will force the outer section 12 of the rim laterally outwardly. Outward movement of the section 12 will carry with it the plates 33 and the wedges 35 so that the said plates will be permitted inward radial movement as shown in Figure 3 and release the tire from the rim. The tire may then be readily and quickly demounted. If desired, the rim section 12 may be entirely removed, the pivotal connection between the sections of the bushings 29 permitting these bushings to assume the position shown in Figure 3. The relative sizes of the heads 19 of the bolts 18 and the openings 28' are such that these heads will readily pass through the openings when the bushings are in the position shown in Figure 3, but the bushings will prevent the heads from moving inwardly through the openings when the parts are arranged as shown in Figure 2.

Reverse rotation of the operating member 24 will move the bolts 18 inwardly, the bushings 29 which are engaged by the collars 32 forcing these bushings into the openings 28'. As the outer section 12 is moved inwardly, the wedges 35 will ride upward along the inner section 11 and as these wedges are beveled and as the section 11 is transversely inclined, the plates 33 will be moved radially outwardly to clamp the tire in place.

The extended portion 27 of the member 24 is housed within a thimble 36 and the latter may be provided with a hinged cover 37. This cover carries a rectangular lug 38 which is adapted to be positioned within the socketed extension 27 so as to prevent accidental rotation of the member 24.

The invention is susceptible of various changes in its form, proportions and minor details of construction and the right is herein reserved to make such changes as properly fall within the scope of the appended claims.

Having described the invention what is claimed is:—

1. In combination with a vehicle wheel, a rim divided circumferentially to provide an inner relatively stationary section and an outer section, circumferentially spaced axially movable locking bolts associated with the sections to lock the sections in tire engaging position or to release the tire, pinions mounted upon the bolts to actuate said bolts and means common to all of the pinions to simultaneously actuate the latter.

2. In combination with a vehicle wheel, a rim divided circumferentially to provide an inner relatively stationary section and an outer section, circumferentially spaced axially movable locking bolts associated with the sections to lock the sections in tire engaging position or to release the tire, pinions mounted upon the bolts to actuate said bolts, an annular rack engaging the bolts to simultaneously actuate the latter and means to actuate the rack.

3. In combination with a vehicle wheel, a rim divided circumferentially to provide an inner relatively stationary section and an outer section, means included in the inner section to provide an annular chamber, locking bolts extending from the felly of the wheel through said chamber, means including a sectional bushing associating the outer ends of the bolts with one of the sections to clamp the latter to the stationary section, means arranged within the annular chamber to simultaneously operate the bolts and means to actuate the bolt operating means.

4. In combination with a vehicle wheel, a rim divided circumferentially to provide an inner relatively stationary section and an outer section, means included in the inner section to provide an annular chamber, locking bolts extending from the felly of the wheel through said chamber, means associating the outer ends of the bolts with one of the sections to clamp the latter to the stationary section, pinions located within the annular chamber and mounted upon and threadedly engaging the bolts, means to prevent rotation of the bolts, means engaging the pinions to simultaneously rotate the latter and move the bolts longitudinally and means to actuate the pinion rotating means.

5. I combination with a vehicle wheel, a rim divided circumferentially to provide an inner relatively stationary section and an outer movable section, means included in the inner section to provide an annular chamber, locking bolts extending from the felly of the wheel through said chamber, pinions located within the annular chamber and threadedly engaging the bolts, means to prevent rotation of the bolts, an annular rack engaging the pinions to simultaneously rotate the latter and move the bolts longitudinally, means to actuate the rack and means connecting the bolts with the outer rim section to hold the latter against lateral movement.

6. In combination with a vehicle wheel, a rim divided circumferentially to provide an inner relatively stationary section and an outer movable section, means included in the inner section to provide an annular chamber, locking bolts extending from the felly of the wheel through said chamber, pinions located within the annular chamber and threadedly engaging the bolts, means to prevent rotation of the bolts, an annular rack engaging the pinion to simultaneously rotate the rack, means connecting the bolts with the outer rim section to hold the latter against lateral movement and means to lock the rack actuating means.

7. In combination with a vehicle wheel, a rim divided circumferentially to provide an inner section and an outer section, means to secure one of said sections to the felly of a wheel to provide a stationary section and a relatively movable section, means to move the movable section laterally, segmental clamping plates carried by the movable section, and transversely disposed wedges associated with the clamping plates to move the latter radially when the movable section is moved laterally.

In testimony whereof I affix my signature.

HYMAN S. GOODKOWITZ.